No. 745,159. Patented November 24, 1903.

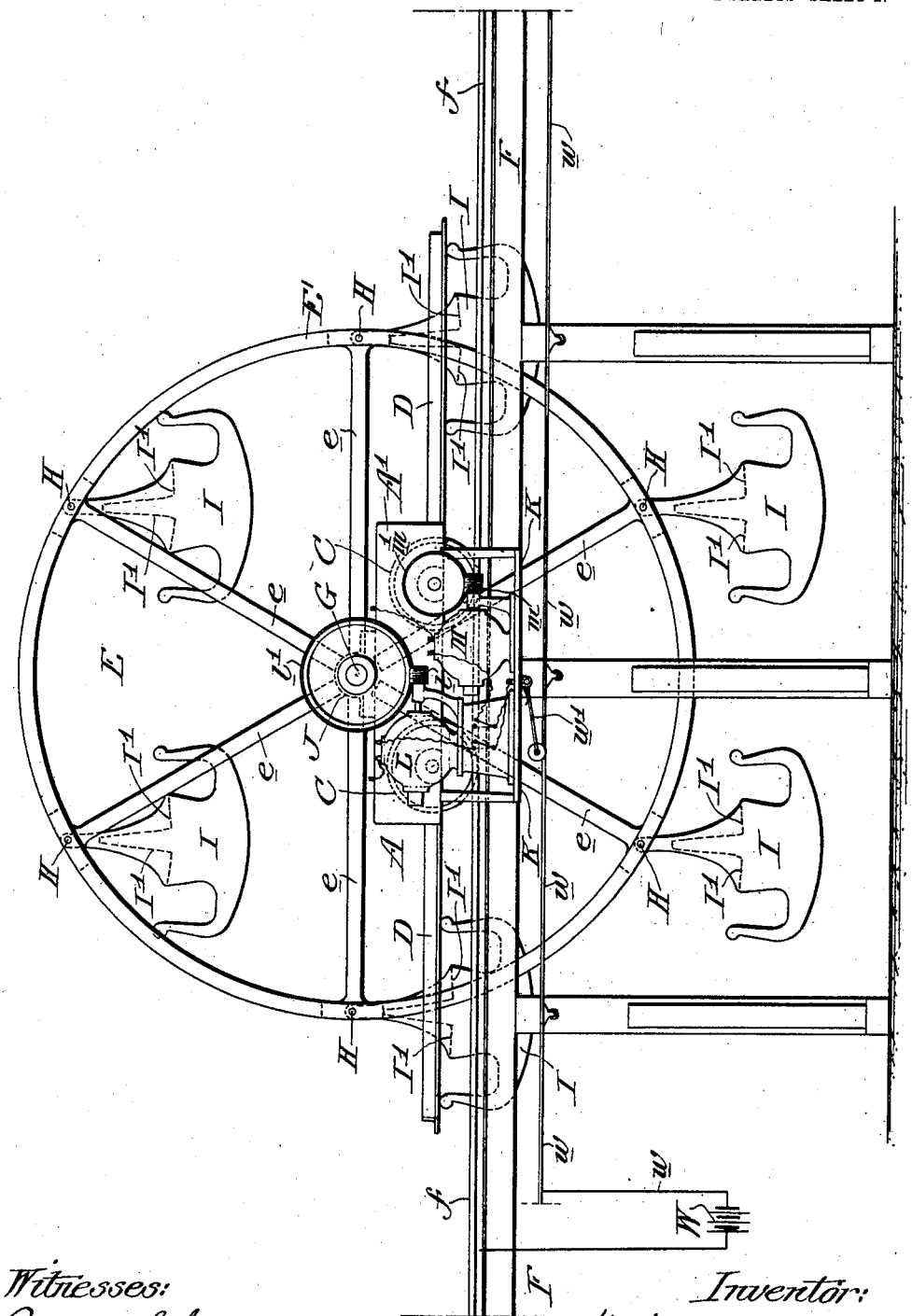

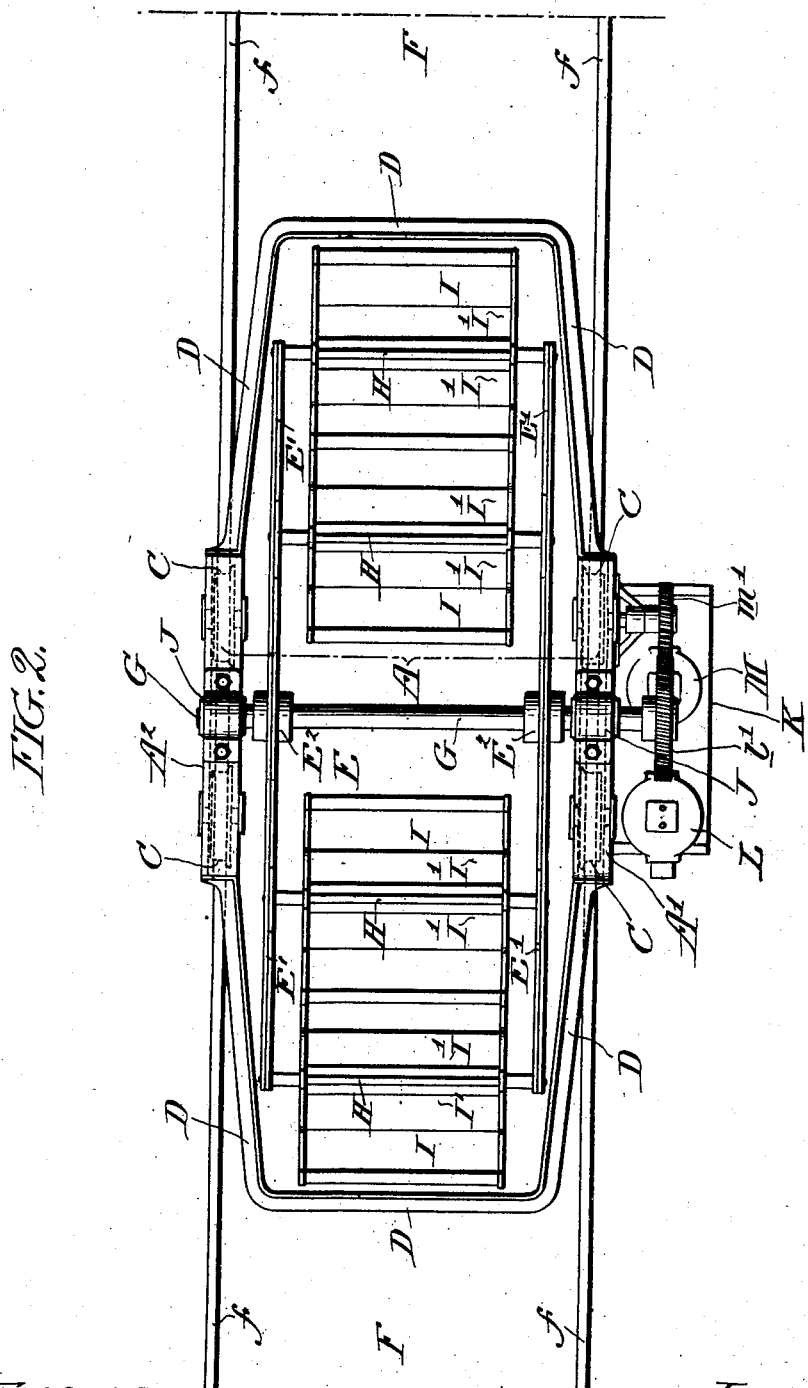

UNITED STATES PATENT OFFICE.

WILLIAM D. CRONIN, OF ATLANTIC CITY, NEW JERSEY, ASSIGNOR OF ONE-HALF TO SAMUEL GREGSON, OF ATLANTIC CITY, NEW JERSEY; LIZZIE H. CRONIN ADMINISTRATRIX OF SAID WILLIAM D. CRONIN, DECEASED.

CYCLOIDAL CHARIOT.

SPECIFICATION forming part of Letters Patent No. 745,159, dated November 24, 1903.

Application filed October 21, 1902. Serial No. 128,152. (No model.)

*To all whom it may concern:*

Be it known that I, WILLIAM D. CRONIN, a citizen of the United States, residing at Atlantic City, in the county of Atlantic and State of New Jersey, have invented certain new and useful Improvements in Revolving Railways, of which the following is a specification.

My invention relates to certain novel features in the details of construction of that class of pleasure-railways known as "revolving" railways which are employed at seashore and mountain resorts and other public places.

My invention has for its object the details of construction embodied in the commercial reduction to practice of such devices, which, among other things, comprise means for operating the truck independent of the wheel which is supported and carried thereby, and in other details of construction, all of which will be hereinafter fully illustrated and described.

Referring to the accompanying drawings, Figure 1 illustrates a side view of the device forming the subject-matter of my invention, showing the manner in which the device is operated upon a railway; and Fig. 2 is a plan of the same, showing, among other things, the manner of operating both the chariot-wheel and the trucks by which the same is carried.

Referring to the reference-letters, A represents the truck, which is formed of hollow supporting members A' and A², each of which is properly journaled to receive flanged supporting-wheels C, adapted to rails $ff$ of the track F. The truck members A' and A² are connected together by a frame D, which forms a structural loop in which the wheel E revolves. The wheel E is formed of two metal rims E' E', which have spokes $e\ e$, &c., connected to hubs E² E², mounted upon a shaft G. Extending from one to the other of the rims E' are rods H, to which are journaled the carriages I, provided in the usual manner with seats I'. The shaft G, upon which the wheel E is turned, is supported upon journals J J', secured to the truck members A' and A².

The truck member A' is provided with a projecting platform K, which forms a support for the motors L and M, the former driving the wheel E through the medium of a worm $l$ and worm-wheel $l'$ and the latter in a similar manner driving one of the truck-wheels through the medium of a worm $m$ and worm-wheel $m'$. The power necessary to drive said motors is carried over a wire $w$ and supplied to the motors through trolley connections $w'$, the return-current to the source of electrical energy W being carried over one of the rails $f$, as illustrated in Fig. 2.

In operating the device the wheel E is turned to bring one of the carriages to a desired position, while the truck remains stationary in order to allow the first of the series of carriages to be entered. When the carriages have been filled, the motor driving the truck is set in motion, and as the truck is carried over the rails the wheel E is also caused to revolve, which gives the occupants of the carriages a motion in two directions, one around the axis of the wheel E and the other along the track F.

Having described my invention, what I claim, and desire to secure by Letters Patent, is—

1. A cycloidal chariot comprising a wheel of large diameter, provided with pivoted carriages, a truck arranged on each side of the wheel, and supporting the same, and a frame connected to the truck members and surrounding the wheel, substantially as specified.

2. A device of the character specified, comprising a truck, a structural loop supported centrally by the truck, a wheel revolutely mounted upon the truck within the loop, and guide-wheels carried by the truck, and adapted to rails, substantially as specified.

3. A device of the character specified, comprising in combination a truck centrally divided and connected by a loop, a wheel revolutely mounted upon said truck within the loop, means for driving said wheel, and means independent of the wheel mechanism for driving the truck, substantially as specified.

4. In combination, a truck comprising supporting members each of which is provided with a pair of supporting-wheels adapted to a track, a wheel revolutely mounted upon the truck, a frame inclosing said wheel, and connected to the truck members, means for driving said wheel, and means for driving the truck independent of the means for operating the wheel, substantially as specified.

5. In combination, a truck, comprising hollow supporting members each of which is provided with a pair of supporting-wheels adapted to a track, a wheel revolutely mounted upon the truck, a frame extending in a horizontal plane around the wheel and connected to the truck members, an electric motor adapted through the medium of a worm and worm-wheel to drive said wheel, and a motor adapted to operate the wheel of the truck independent of the power for driving the wheel, substantially as specified.

6. In a device of the character described, a truck, a wheel revolutely mounted upon said truck, means for driving said wheel, and means independent of the wheel mechanism for driving the truck, substantially as described.

In testimony whereof I affix my signature in presence of two witnesses.

WILLIAM D. CRONIN.

Witnesses:
WILLIAM T. LEEK,
WALTER W. CALMORE.